US011345866B2

(12) United States Patent
Mazumdar et al.

(10) Patent No.: US 11,345,866 B2
(45) Date of Patent: May 31, 2022

(54) PROCESS FOR PRODUCTION OF MARPOL COMPLIANT BUNKER FUEL FROM PETROLEUM RESIDUES

(71) Applicant: Indian Oil Corporation Limited, Mumbai (IN)

(72) Inventors: Sanjiv Kumar Mazumdar, Faridabad (IN); Shivam Ashok Dixit, Faridabad (IN); Satyen Kumar Das, Faridabad (IN); Terapalli Hari Venkata Devi Parsad, Faridabad (IN); Ponoly Ramachandran Pradeep, Faridabad (IN); Manisha Saraswat, Faridabad (IN); Madhusudan Sau, Faridabad (IN); Sankara Sri Venkata Ramakumar, Faridabad (IN)

(73) Assignee: INDLIN OIL CORPORATION LIMITED, Mumbai (IN)

(*) Notice: Subject to any disclaimer, the term of this patent is extended or adjusted under 35 U.S.C. 154(b) by 0 days.

(21) Appl. No.: 17/170,412

(22) Filed: Feb. 8, 2021

(65) Prior Publication Data
US 2021/0246380 A1 Aug. 12, 2021

(30) Foreign Application Priority Data

Feb. 7, 2020 (IN) .............................. 202021005527

(51) Int. Cl.
*C10G 55/04* (2006.01)
*C10L 1/08* (2006.01)
(Continued)

(52) U.S. Cl.
CPC .............. *C10G 55/04* (2013.01); *B01D 3/10* (2013.01); *B01D 3/40* (2013.01); *C10L 1/08* (2013.01);
(Continued)

(58) Field of Classification Search
CPC ......... A01B 39/18; A01B 51/02; A01C 14/00; A01C 21/005; A01C 21/007; A01C 7/06; A01G 25/092; A01G 25/16; B01D 3/10; B01D 3/40; C10G 2300/1003; C10G 2300/107; C10G 2300/1077; C10G 2300/202; C10G 2300/205; C10G 2300/207; C10G 2300/208; C10G 2300/301; C10G 2300/302;
(Continued)

(56) References Cited

U.S. PATENT DOCUMENTS

| 4,006,076 A | 2/1977 | Christensen et al. |
| 2019/0040329 A1* | 2/2019 | Moore .................. C10G 69/04 |
| 2019/0225896 A1* | 7/2019 | De Araujo Monteiro .................... C10G 67/14 |

FOREIGN PATENT DOCUMENTS

| CN | 102746890 A | 10/2012 |
| RU | 2185415 C1 | 7/2002 |

* cited by examiner

Primary Examiner — Ellen M McAvoy
Assistant Examiner — Chantel L Graham
(74) Attorney, Agent, or Firm — Workman Nydegger

(57) ABSTRACT

This invention relates to production of low sulfur MARPOL compliant bunker fuel oil and distillates using high sulfur residue, low sulfur residue and/or blend of high and low sulfur residue feed stock. The invention also describes a method for production of a cutterstock stream having a lower paraffin and higher aromatic content than a feed stream using a paraffin separation section and its blending to produce bunker fuel.

19 Claims, 1 Drawing Sheet

(51) Int. Cl.
  *B01D 3/40* (2006.01)
  *B01D 3/10* (2006.01)
(52) U.S. Cl.
  CPC .............. *C10G 2300/1003* (2013.01); *C10G 2300/107* (2013.01); *C10G 2300/1077* (2013.01); *C10G 2300/202* (2013.01); *C10G 2300/205* (2013.01); *C10G 2300/207* (2013.01); *C10G 2300/208* (2013.01); *C10G 2300/301* (2013.01); *C10G 2300/302* (2013.01); *C10G 2300/304* (2013.01); *C10G 2300/308* (2013.01); *C10G 2300/4006* (2013.01); *C10G 2300/4012* (2013.01); *C10G 2400/04* (2013.01); *C10L 2200/0438* (2013.01); *C10L 2270/026* (2013.01); *C10L 2290/06* (2013.01); *C10L 2290/24* (2013.01); *C10L 2290/543* (2013.01)

(58) Field of Classification Search
  CPC ........ C10G 2300/304; C10G 2300/308; C10G 2300/4006; C10G 2300/4012; C10G 2400/04; C10G 55/04; C10G 9/00; C10L 1/08; C10L 2200/0438; C10L 2270/026; C10L 2290/06; C10L 2290/24; C10L 2290/543
  See application file for complete search history.

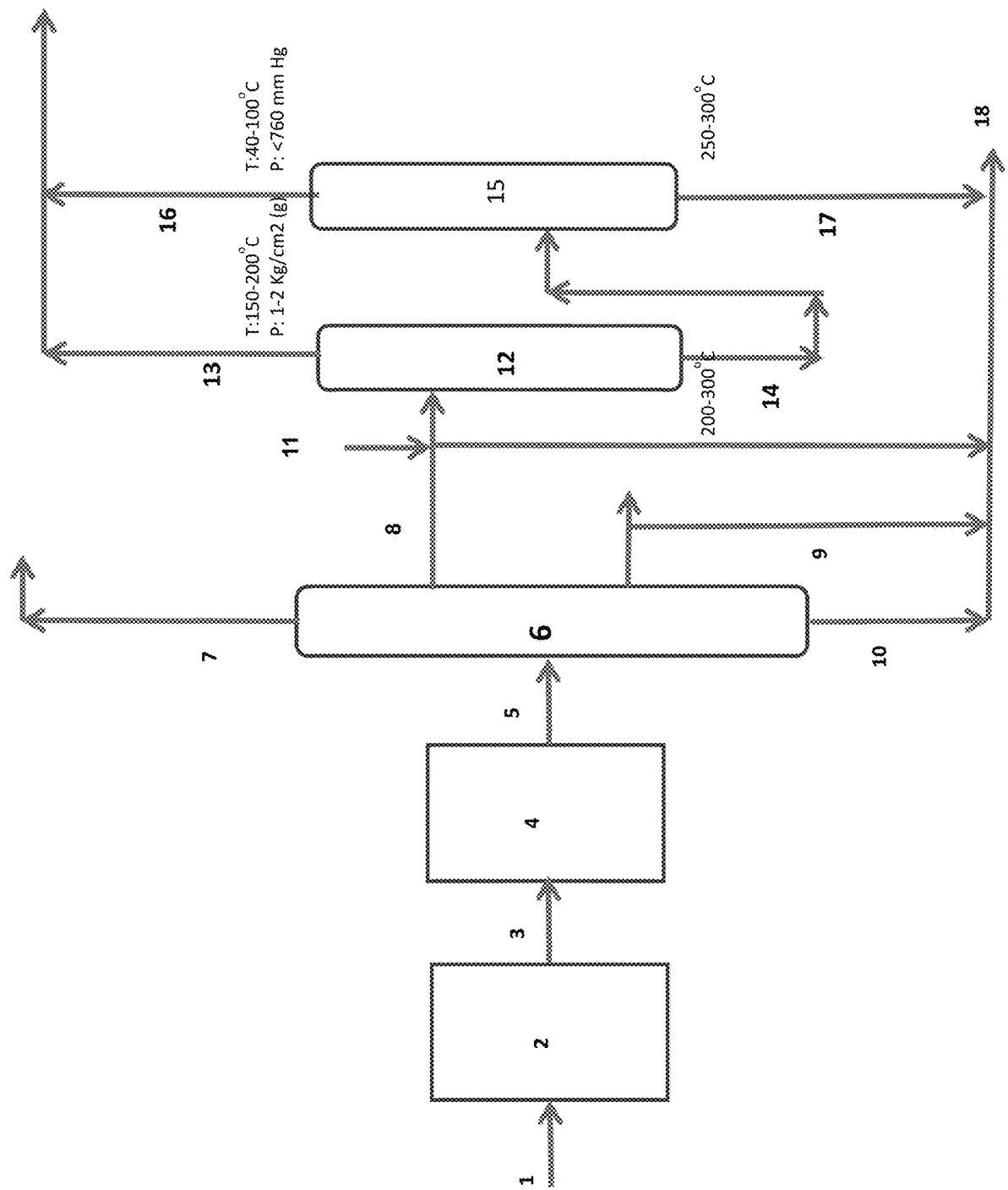

PROCESS FOR PRODUCTION OF MARPOL COMPLIANT BUNKER FUEL FROM PETROLEUM RESIDUES

FIELD OF THE INVENTION

This invention relates to production of low sulfur MARPOL compliant bunker fuel oil & distillates using high sulfur residue, low sulfur residue and/or blend of high and low sulfur residue feed stock. Moreover, this invention also describes a method for production of a stream enriched in aromatic content than a feed stream using a paraffin separation section and its blending.

BACKGROUND OF THE INVENTION

Bunker fuel also known as marine fuel is prepared from petroleum derived residues or distillates and used in ship bunkers. International Maritime Organization has restricted the sulfur content of bunker fuel & reduced its limit from 3.5 wt % to 0.5 wt % to curb emissions from January 2020. In order to adapt to the changed sulfur specification, ship owners either have to shift towards low sulfur fuels or install costly scrubbers to continue using high sulfur fuel. For production of low sulfur residual fuel oil, hydrogen based technology is a costly alternative. Fuel oil generated from thermal cracking processes is also an alternative, provided it meets all the required specifications of bunker FO.

During the winter season, rail transportation of bunker fuel oil to the sea port with pour point +30° C. becomes difficult. Higher the pour point, higher will be the congealing tendency of the liquid. More specifically, during winter season, the ambient temperature is much less than say, 30° C. resulting into congealing of the liquid under ambient conditions and hence difficulties arise during transportation. Bunker fuel having pour point of say, +9° C. will not congeal unless the ambient conditions fall below the same. Hence, there is a requirement of bunker with lower pour point of +9° C. Pour point of fuel oil is the Temperature at which it solidifies or congeals. Pour Point is the temperature at which a liquid becomes semisolid and loses its flowing characteristics. CN102746890A describes a method for preparation of marine fuel oil, comprising visbreaking heavy oil components at 400-450° C. for 10-60 minutes, fractionation of products obtained by visbreaking, collecting and mixing fractions higher than 165° C. with light oil components in different blend ratios to obtain marine fuel oil with desired specifications.

RU2185415C1 describes a method for preparation of marine or boiler fuel. The said preparation is carried out by viscosity breaking of a mixture of mazut with asphalt, isolation of cracked residue followed by mixing with 1-5 wt % selective refined oil extract, up to 10 wt % Heavy catalytic cracking gas oil, up to 2 wt % residual component or Propane deasphalting oils and 0.5-2.5 wt % slop wax.

U.S. Pat. No. 4,006,076 explains a process for production of low sulfur content hydrocarbon mixtures under mild hydro desulfurization conditions along with integration with one or more process steps including hydrodesulphurization of sulfur-containing vacuum residuum, solvent deasphalting of vacuum residuum, or hydrodesulphurization of vacuum residuum and delayed coking at least a portion of product.

For producing marine fuel oil, cracked residue stream generated from thermal cracking process is blended with different cutter stock. Addition of cutter stock is done in such a way so as to produce bunker fuel meeting desired specifications. Pour point is also one of the essential specifications of bunker fuel. In order to produce ultra low pour residual bunker FO (+9° C.), paraffinic cutter stock is required to be added in excess quantity which in turn leads to precipitation of asphaltenes and results into unstable fuel oil. It also affects the flash point specification of bunker fuel.

Therefore, the present invention meets the necessity and provides an integrated process which can enable in-situ aromatic enrichment of a stream generated from fractionation of products from thermal cracking of heaviest feed streams. The stream thus produced is blended in-situ with the residual cracked product thus resulting into production of finished bunker fuel having a very low pour point.

SUMMARY OF THE INVENTION

Due to regulations on sulfur content of bunker fuel oil imposed by International Maritime Organization (IMO), applicable from January 2020, demand for low sulfur fuel oil is expected to increase. One of the key issues addressed by this invention is the production of lower pour point (+9° C.) bunker fuel oil against standard specification of 30° C. while maintaining other specifications.

The present invention relates to an integrated process for producing low pour point MARPOL complaint bunker fuel oil, said process comprising:
a) mild thermal cracking of residue feed stock (1);
b) withdrawing 140-280° C. boiling range stream (8) from the cracked effluent stream;
c) subjecting the withdrawn stream of 140-280° C. boiling range (8) along with straight run kerosene stream (11) to stripping and vacuum column separation for producing an aromatic enriched stream (17) with a low pour point;
d) blending the aromatic enriched stream (17) with 380° C.+ fraction (10) from mild thermal cracking and paraffinic stream (8) to produce MARPOL compliant bunker fuel oil having low pour point and high flash point.

In yet another embodiment, the present invention relates to an integrated process for producing low pour point MARPOL complaint bunker fuel oil, said process comprising of steps:
a) heating liquid hydrocarbon feedstock (1) in a furnace (2) of the mild thermal cracking unit;
b) sending heated stream (3) from furnace to a reactor (4) to obtain reactor effluents (5);
c) fractionating reactor effluents (5) in a separator (6) for obtaining fractions with boiling ranges 140° C.− (7), 140-280° C. (8), 280-380° C. (9) and 380° C.+ (10);
d) withdrawing a paraffinic stream (8) of boiling range 140-280° C. from the fractionator column (6);
e) using the paraffinic stream (8) along with a straight run kerosene stream (11) as a feed stock for in-situ aromatic enrichment through stripping followed by vacuum column separation to obtain aromatic enriched stream (17);
f) blending 380° C.+ fraction (10) with aromatic enriched stream (17), paraffinic stream (8) and 280-380° C. boiling fraction (9) to produce bunker fuel oil.

OBJECTIVES OF THE PRESENT INVENTION

It is a primary objective of the present invention which relates to production of low pour point MARPOL compliant bunker fuel oil & distillates using residue. The International Convention for the Prevention of Pollution from Ships (MARPOL) is the main international convention covering prevention of pollution of the marine environment by ships from operational or accidental causes.

It is the further objective of the present invention which covers an integrated process for in-situ aromatic enrichment of an extraneous paraffinic stream (Kerosene fraction) in conjunction with hydrocarbon product of similar boiling range (140-280° C.) being produced as a result of mild thermal cracking of residue feed stock and subsequently using it to produce a residual fuel oil with low pour point.

It is another objective of the present invention to improve the flash point as well as pour point of the extraneous paraffinic stream (Kerosene fraction) in conjunction with hydrocarbon product of similar boiling range (140-280° C.) by means of stripping followed by vacuum separation.

It is another objective of the present invention to improve the stability of the MARPOL compliant bunker fuel.

It is another objective of the present invention to reduce the requirement of cutter stock for production of MARPOL compliant bunker fuel thereby increases the profitability of the refinery.

It is the further objective of the present invention which covers the process for production of MARPOL compliant bunker fuel oil of low pour point of +9° C. against standard specification of +30° C. from petroleum residues.

BRIEF DESCRIPTION OF DRAWING

To further clarify advantages and aspects of the invention, a more particular description of the invention will be rendered by reference to specific embodiments thereof, which is illustrated in the appended drawing(s). It is appreciated that the drawing(s) depict only typical embodiments of the invention and are therefore not to be considered limiting of its scope.

FIG. 1: Schematic of the process for production of low pour point MARPOL complaint bunker fuel oil and distillates using residue.

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein.

The terminology and structure employed herein is for describing, teaching and illuminating some embodiments and their specific features and elements and does not limit, restrict or reduce the spirit and scope of the invention.

Unless otherwise defined, all terms, and especially any technical and/or scientific terms, used herein may be taken to have the same meaning as commonly understood by one having an ordinary skill in the art.

In one of the embodiment, the present invention relates to an integrated process for producing low pour point MARPOL complaint bunker fuel oil, said process comprising:
a) mild thermal cracking of residue feed stock (1);
b) withdrawing 140-280° C. boiling range stream (8) from the cracked effluent stream;
c) subjecting the withdrawn stream of 140-280° C. boiling range (8) along with straight run kerosene stream (11) to stripping and vacuum column separation for producing an aromatic enriched stream (17) with a low pour point;
d) blending the aromatic enriched stream (17) with 380° C.+ fraction (10) from mild thermal cracking and paraffinic stream (8) to produce MARPOL compliant bunker fuel oil having low pour point and high flash point.

In yet another embodiment, the present invention relates to an integrated process for producing low pour point MARPOL complaint bunker fuel oil, said process comprising of steps:
a) heating liquid hydrocarbon feedstock (1) in a furnace (2) of the mild thermal cracking unit;
b) sending heated stream (3) from furnace to a reactor (4) to obtain reactor effluents (5);
c) fractionating reactor effluents (5) in a separator (6) for obtaining fractions with boiling ranges 140° C.– (7), 140-280° C. (8), 280-380° C. (9) and 380° C.+ (10);
d) withdrawing a paraffinic stream (8) of boiling range 140-280° C. from the fractionator column (6);
e) using the paraffinic stream (8) along with a straight run kerosene stream (11) as a feed stock for in-situ aromatic enrichment through stripping followed by vacuum column separation to obtain aromatic enriched stream (17);
f) blending 380° C.+ fraction (10) with aromatic enriched stream (17), paraffinic stream (8) and 280-380° C. boiling fraction (9) to produce bunker fuel oil.

In yet another embodiment, the liquid hydrocarbon feedstock (1) is selected from a group comprising heavy hydrocarbon feed stocks like vacuum residue, atmospheric residue, pitch having sulfur content in the range 0.1-0.6 wt %. In yet another embodiment, the reactor of the mild thermal cracking process is operated at the desired operating temperature ranging from 400 to 470° C. and desired operating pressure ranging from 5 to 20 Kg/cm$^2$ (g). In yet another embodiment, the reactor of the mild thermal cracking process is operated at a residence time ranging from 10-40 minutes. In yet another embodiment, stripper section (12) is having top temperature in the range of 150-200° C., top pressure 1-2 Kg/cm$^2$ (g) and bottom temperature: 200-300° C. In yet another embodiment, vacuum separation system is having top temperature: 40-100° C., pressure below 760 mm Hg and bottom temperature of the vacuum separator ranges from 250-300° C. In yet another embodiment, said aromatic enriched stream (17) is having higher flash point and aromatic content as compared to the feed stock (8/11). In yet another embodiment, wherein said bunker fuel oil is having sulfur in the range of 0.1-0.5 wt %. In yet another embodiment, said bunker fuel oil is having lower pour point (+9° C.). In yet another embodiment, aromatic enrichment of 140-280° C. boiling stream (8) provides stability to the residue from mild thermal cracking by solubilizing the asphaltenes present in it. In yet another embodiment, Low pour point MARPOL complaint bunker fuel oil obtained by the process as claimed in claim 1 or 2 having lower pour point (+9° C.) and sulfur in the range of 0.1-0.5 wt %. In yet another embodiment, MARPOL compliant bunker fuel is produced using 380° C.+ boiling fraction (10) in the range of 60-80 wt %, 140-280° C. boiling fraction (8) in the range of 5-15 wt %, aromatic enriched stream (17) in the range of 5-15 wt % and 280-380° C. boiling fraction (9) in the range of 0-5 wt %. In yet another embodiment, flash point of paraffinic stream is in the range of 30-60° C. and it increases to 100-130° C. due to aromatic enrichment.

According to the present invention, method of production of residual bunker fuel oil comprises of an integrated process comprising combination of a) mild thermal cracking of residue feed stock b) Withdrawal of 140-280° C. boiling range stream from the cracked effluent stream c) Subjecting the withdrawn stream along with straight run kerosene stream to a two stage separation for producing an aromatic enriched stream with an optimum pour point which is blended with residue from mild thermal cracking to produce MARPOL compliant bunker fuel oil. The aromatic enriched stream thus produced is an effective cutter stock component for blending to produce marine residual fuel oil with a low pour & a high flash point. Flash point is the lowest temperature at which a hydrocarbon vaporizes to form an ignitable mixture with air. MARPOL compliant bunker fuel has a flash point specification of 60° C. minimum. As a result of aromatic enrichment, flash point of the cutter stock stream increases which when blended with residual oil enhances the flash point of MARPOL compliant bunker fuel and helps in producing the bunker fuel of required specification. Cutter stock is a hydrocarbon stream which is blended to reduce the viscosity of the resulting blend. However, it also affects other properties of the blend such as pour point, flash point etc. In addition to this, aromatic enrichment of 140-280° C. boiling stream also imparts additional stability to the residue from mild thermal cracking by solubilizing the asphaltenes present in it.

Feedstock:

Liquid hydrocarbon feedstock is to be used in the process which can be selected from heavy hydrocarbon feed stocks like vacuum residue, atmospheric residue, pitch having low sulfur content below 0.6 wt % and paraffinic stream selected from kerosene, gas oils.

Process Conditions:

Reactor of the mild thermal cracking process may be operated at the desired operating temperature ranging from 400 to 470° C., preferably between 425 to 440° C. and desired operating pressure ranging from 5 to 20 Kg/cm$^2$ (g), preferably between 8 to 15 Kg/cm' (g) at a residence time ranging from 10-40 minutes A paraffinic stream of boiling range 140-280° C. is withdrawn from Fractionator column of Mild thermal cracking Unit and further subjected to stripping followed by vacuum column separation along with straight run kerosene stream. The stripper section has a top temperature in the range of 150-200° C., top pressure 1-2 Kg/cm$^2$ (g) and bottom temperature: 200-300° C. The vacuum separation system has a top temperature: 40-100° C. and Pressure below 760 mm Hg. Bottom temperature of the vacuum separator ranges from 250-300° C.

Process Description:

In one of the embodiments of the present invention as described by schematic in FIG. 1, for feed having sulfur in the range of 0.1-0.6 wt %, fresh feed (1) is heated in furnace (2) of the mild thermal cracking unit.

Heated stream (3) from furnace is sent to a reactor (4). Heavy molecules present in the residue feed crack into lighter molecules in the reactor due to high temperature and residence time. Reactor effluents (5) are fractionated in a separator (6) for separation into fractions with boiling ranges 140° C.– (7), 140-280° C. (8), 280-380° C. (9) and 380° C.+(10). A paraffinic stream (8) separated from the separator (6) along with a straight run kerosene stream (11) is used as a feed stock for in-situ aromatic enrichment through a stripper (12) and a vacuum column (13). Stripper bottom (14) is further enriched in a vacuum column (15). Aromatic enriched stream (17) resulting from the bottom of second stage separator has a higher flash point and aromatic content as compared to the feed stock (8/11). 380° C.+ fraction (10) is thereafter blended with aromatic enriched stream (17), paraffinic stream (8) and 280-380° C. fraction (9) to produce bunker fuel oil. Blending of aromatic enriched stream will impart additional stability to 380° C.+ fraction due to solubilization of asphaltenes present. Low pour point MARPOL complaint bunker fuel oil is shown as reference (18) in FIG. 1.

EXAMPLES

Example 1

Residue feed stock (Stream A) having properties as mentioned in Table-1 was subjected to mild thermal cracking at a temperature of 435° C. in a reactor at 11 Kg/cm$^2$ (g) pressure. The product stream from mild thermal cracking was separated into light (Stream B) and heavy residue streams (Stream C). Heavy residue material (Stream C) obtained thereof was fractionated into a fraction boiling at a temperature below 380° C. (Stream D) and another fraction boiling above 380° C. (Stream E). Stream D was further separated into fraction in the boiling range of 140° C.–, 140-280° C. (Stream F) and another fraction in the boiling range of 280-380° C. (Stream G). Stream F was mixed with another stream (Stream H) with aromatic content of 21 mol % and having property as mentioned in Table-2 and combined stream (Stream I) was generated. Stream I so generated was subjected to fractionation at atmospheric pressure (1 atm) and to separate components boiling below 170° C. (Stream J) and components boiling above 170° C. (Stream K). Stream K so generated is the intermediate stream and it was subjected to fractionation under vacuum (520 mm Hg) pressure. As a result of fractionation of Stream K, components boiling below 230° C. (Stream L) and components boiling above 230° C. (Stream M) with aromatic content of 27 mol % were obtained having property as described in Table-3. Stream M was then blended along with Stream E and Stream H in a ratio provided in Table-4 to produce low sulphur residual fuel oil having property as provided in Table-5.

TABLE 1

Residue Feed property (Stream A)
Feed Analysis

| Property | Analysis Result |
| --- | --- |
| CCR, wt % | 13.6 |
| Sulfur, wt % | 0.34 |
| Total Acid Number, mgKOH/gm oil | 1.8 |
| Metals, ppm Ca/Cu/Fe/Mg/Na/Ni/Si/V | 81/<1/48/2/72/205/5/10 |
| Pour Point, ° C. | 42 |
| Viscosity at 100° C., cSt | 906.5 |
| Density at 15° C., g/ml | 0.9789 |
| SimDist, ASTM D6352 5/10/30/50/70/90/95 | 446/479/539/574/606/651/680 |

TABLE 2

Property of Stream H

| Property | Stream H |
| --- | --- |
| Density at 15° C., g/ml | 0.794 |
| SimDist, ASTM D 2887 5/10/30/50/70/90/95 | 137/149/178/200/223/252/264 |
| Viscosity at 40° C., cSt | 1.222 |
| Flash Point, ° C. | 46 |
| Pour Point, ° C. | −57 |
| Sulfur, wt % | 0.35 |

TABLE 3

Property of Stream M

| Property | Stream M |
|---|---|
| Density at 15° C., g/ml | 0.8354 |
| SimDist, ASTM D 2887 5/10/30/50/70/90/95 | 234/238/250/256/261/272/278 |
| Viscosity at 40° C., cSt | 2.343 |
| Flash Point, ° C. | 119 |
| Pour Point, ° C. | −33 |
| Sulfur, wt % | 0.34 |

TABLE 4

Ratio of Mixing of streams to produce bunker fuel

| Component | Wt % |
|---|---|
| Stream E | 77 |
| Stream H | 13 |
| Stream M | 10 |

In one of the embodiment, Stream E (77 wt %), Stream H (13 wt %) and Stream M (10 wt %) are mixed to produce bunker fuel.

TABLE 5

Property of bunker fuel

| Property | Value |
|---|---|
| Density at 15° C. Kg/m$^3$ | 938 |
| Viscosity at 50° C., cSt | 227 |
| Flash Point, ° C. | 65 |
| Pour Point, ° C. | +18 |
| CCR, wt % | 12.8 |
| Ash, wt % | 0.04 |
| Water, vol % | 0.4 |
| Sulfur, wt % | 0.36 |
| Vanadium, ppmw | 8 |
| Total sediment, wt % | 0.06 |
| Acid Number, mgKOH/g | 1 |
| Aluminium plus silicon, mg/Kg | 5 |
| Sodium, ppmw | 50 |
| Used Lubricating Oils | NIL |

In yet another embodiment, the bunker fuel is having values as listed in table 5 above.

Example 2

Another experiment was carried out in which Streams E, G, H and M were generated as described in Example 1. The generated streams were blended in ratio as provided in Table-6 and bunker fuel having specification provided in Table-7 was prepared.

TABLE 6

Ratio of mixing of streams in example-2

| Component | Wt % |
|---|---|
| Stream E | 73 |
| Stream G | 5 |
| Stream H | 13 |
| Stream M | 9 |

In one of the embodiment, Stream E (73 wt %), Stream G (5 wt %), Stream H (13 wt %) and Stream M (9 wt %) are mixed to produce bunker fuel.

TABLE 7

Property of bunker fuel prepared in example-2

| Property | Value |
|---|---|
| Density at 15° C., Kg/m$^3$ | 932 |
| Viscosity at 50° C., cSt | 153 |
| Flash Point, ° C. | 63 |
| Pour Point, ° C. | +9 |
| CCR, wt % | 12.1 |
| Ash, wt % | 0.07 |
| Water, vol % | 0.3 |
| Sulfur, wt % | 0.37 |
| Vanadium, ppmw | 7 |
| Total sediment, wt % | 0.03 |
| Acid Number, mgKOH/g | 0.76 |
| Aluminium plus silicon, mg/Kg | 4 |
| Sodium, ppmw | 39 |
| ULO | NIL |

In yet another embodiment, the bunker fuel obtained in example 2 is having values as listed in table 7 above.

Advantages of the Present Invention

The following are the technical advantages of the present invention over the prior art as disclosed above:
1) Produces low sulphur bunker Fuel oil compliant with MARPOL specifications.
2) Meets requirement of low pour point in winter season.
3) No requirement of depressant for lower pour point.
4) Additional cutter stock savings.
5) Enhanced Fuel oil Stability.
6) Easily integratable with the existing process.
7) Reduced dependence for cutter stock from other units.

While specific language has been used to describe the present subject matter, any limitations arising on account thereto, are not intended. As would be apparent to a person in the art, various working modifications may be made to the method in order to implement the inventive concept as taught herein.

The invention claimed is:

1. An integrated process for producing a low pour point MARPOL compliant bunker fuel oil, said process comprising:
   a) subjecting a residue feed stock to mild thermal cracking in a mild thermal cracking unit to produce a cracked effluent stream, wherein the mild thermal cracking unit comprises a furnace and a reactor; wherein the residue feed stock is subjected to thermal cracking to form lighter fractions;
   b) fractionating the thermally cracked effluent stream from an outlet of the reactor in a fractionator column for obtaining streams with boiling ranges 140° C.−, 140-280° C., 280-380° C. and 380° C.+;
   c) withdrawing the 140-280° C. boiling range stream from the cracked effluent stream;
   d) subjecting the withdrawn stream and a straight run kerosene stream to stripping in a stripper and fractionating in a vacuum column separator for producing an aromatic enriched stream in-situ; and
   e) blending the aromatic enriched stream, the 380° C.+ fraction, and a paraffinic stream to produce the low pour point MARPOL compliant bunker fuel oil.

2. The process as claimed in claim 1, wherein the residue feed stock is selected from a group consisting of a vacuum residue, an atmospheric residue, and a pitch having a sulfur content in a range 0.1-0.6 wt %.

3. The process as claimed in claim 1, wherein the stripper is having has a top temperature in a range of 150-200° C., a top pressure in a range of 1-2 Kg/cm² (g) and a bottom temperature in a range of 200-300° C.

4. The process as claimed in claim 1, wherein the vacuum column separator has a top temperature in a range of 40-100° C., a pressure below 760 mm Hg and a bottom temperature in a range of 250-300° C.

5. The process as claimed in claim 1, wherein the low pour point MARPOL compliant bunker fuel is produced using the 380° C.+ boiling fraction in a range of 60-80 wt %, the 140-280° C. boiling fraction in a range of 5-15 wt %, the aromatic enriched stream in a range of 5-15 wt % and a 280-380° C. boiling fraction in a range of 0-5 wt %.

6. The process as claimed in claim 1, wherein the low pour point MARPOL compliant bunker fuel oil has a pour point of (+9° C.).

7. The process as claimed in claim 1, wherein the low pour point MARPOL compliant bunker fuel oil has sulfur in a range of 0.1-0.5 wt %.

8. An integrated process for producing a low pour point MARPOL complaint compliant bunker fuel oil, said process comprising:
   a) heating a liquid hydrocarbon feedstock in a furnace of a mild thermal cracking unit;
   b) sending the heated stream from the furnace to a reactor to obtain the cracked effluent stream;
   c) fractionating the cracked effluent stream in a fractionator column for obtaining fractions with boiling ranges 140° C.−, 140-280° C., 280-380° C. and 380° C.+;
   d) withdrawing a paraffinic stream of boiling range 140-280° C. from the fractionator column;
   e) using the paraffinic stream along with a straight run kerosene stream as a feed stock for in-situ aromatic enrichment through stripping in a stripper followed by separation in a vacuum column separator to obtain an aromatic enriched stream;
   f) blending the 380° C.+ fraction, the aromatic enriched stream, the paraffinic stream and the 280-380° C. boiling fraction to produce the low pour point MARPOL compliant bunker fuel oil.

9. The process as claimed in claim 8, wherein the liquid hydrocarbon feedstock is selected from a group consisting of a vacuum residue, an atmospheric residue, a pitch having sulfur content in a range of 0.1-0.6 wt %.

10. The process as claimed in claim 8, wherein the reactor of the mild thermal cracking unit is operated at an operating temperature ranging from 400 to 470° C. and at an operating pressure ranging from 5 to 20 Kg/cm² (g).

11. The process as claimed in claim 8, wherein the reactor of the mild thermal cracking unit is operated at a residence time ranging from 10-40 minutes.

12. The process as claimed in claim 8, wherein the stripper has a top temperature in a range of 150-200° C., a top pressure 1-2 Kg/cm² (g) and a bottom temperature in a range of 200-300° C.

13. The process as claimed in claim 8, wherein the vacuum column separator separation system is having has a top temperature in a range of 40-100° C., a pressure below 760 mm Hg and a bottom temperature in a range of 250-300° C.

14. The process as claimed in claim 8, wherein the aromatic enriched stream has a higher flash point and aromatic content as compared to the liquid hydrocarbon feed stock.

15. The process as claimed in claim 8, wherein the low pour point MARPOL compliant bunker fuel oil is produced using the 380° C.+ boiling fraction in a range of 60-80 wt %, the 140-280° C. boiling fraction in a range of 5-15 wt %, the aromatic enriched stream in a range of 5-15 wt % and the 280-380° C. boiling fraction in a range of 0-5 wt %.

16. The process as claimed in claim 8, wherein aromatic enrichment of 140-280° C. boiling stream provides stability to a residue from the mild thermal cracking unit by solubilizing asphaltenes present.

17. The process as claimed in claim 8, wherein a flash point of the paraffinic stream is in a range of 30-60° C. and increases to 100-130° C. due to the aromatic enrichment.

18. The process as claimed in claim 8, wherein the low pour point MARPOL compliant bunker fuel oil has a sulfur in a range of 0.1-0.5 wt %.

19. The process as claimed in claim 8, wherein the low pour point MARPOL compliant bunker fuel oil has a lower pour point of (+9° C.).

* * * * *